(12) United States Patent
Lhomme et al.

(10) Patent No.: US 7,478,877 B2
(45) Date of Patent: Jan. 20, 2009

(54) CHILD CAR SEAT PIVOTING BETWEEN A UTILISATION POSITION AND AT LEAST AN INSTALLATION POSITION AND HAVING A LATCH

(75) Inventors: Gilles Lhomme, Chateau d'Olonne (FR); Richard Biaud, Trementines (FR)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 11/766,071

(22) Filed: Jun. 20, 2007

(65) Prior Publication Data
US 2008/0054693 A1   Mar. 6, 2008

(30) Foreign Application Priority Data
Sep. 1, 2006   (FR)   .................................. 06 07707

(51) Int. Cl.
A47D 1/10   (2006.01)
(52) U.S. Cl. ............................. 297/256.12; 297/256.13; 297/256.16
(58) Field of Classification Search ............ 297/256.12, 297/256.13, 256.16
See application file for complete search history.

(56) References Cited

U.S. PATENT DOCUMENTS

| | | | | |
|---|---|---|---|---|
| 1,756,807 A | * | 4/1930 | Black | 297/329 |
| 2,153,155 A | * | 4/1939 | Page et al. | 297/342 |
| 2,182,598 A | * | 12/1939 | Owler | 297/343 |
| 2,229,608 A | * | 1/1941 | Ragsdale et al. | 297/62 |
| 2,374,848 A | * | 5/1945 | Hall | 297/14 |
| 2,583,372 A | * | 1/1952 | Hall | 297/14 |
| 2,712,346 A | * | 7/1955 | Sprinkle | 297/344.12 |
| 2,725,921 A | * | 12/1955 | Morris | 297/216.15 |
| 2,859,797 A | * | 11/1958 | Mitchelson | 297/61 |
| 3,404,917 A | * | 10/1968 | Smith | 297/256.13 X |
| 3,567,280 A | * | 3/1971 | Bradshaw | 297/318 |
| 3,596,986 A | * | 8/1971 | Ragsdale | 297/183.6 |
| 4,058,342 A | * | 11/1977 | Ettridge | 297/256.13 |

(Continued)

FOREIGN PATENT DOCUMENTS

EP   1110807   6/2001

(Continued)

OTHER PUBLICATIONS

International Search Report for French Application 0607707, dated Apr. 5, 2007.

*Primary Examiner*—Rodney B. White
(74) *Attorney, Agent, or Firm*—Barnes & Thornburg LLP (57) ABSTRACT

A child car seat includes a base and a backrest. The seat is pivotally disposed on the base and may pivot between a utilization position, where the seat faces a road, and an installation position, where the seat is turned toward a door of the vehicle. The seat includes a first locking element disposed on the backrest at a portion of the backrest adapted to abut against a backrest of the vehicle seat and a second locking element disposed on a vertical part of the base. The first locking element includes a mobile hook and a latch to engage the mobile hook. The mobile hook and the latch are locked together in a locked position as the seat is moved to the utilization position. The mobile hook and the latch are disengaged in an unlocked position as the seat is moved to the installation position.

13 Claims, 5 Drawing Sheets

U.S. PATENT DOCUMENTS

| | | | |
|---|---|---|---|
| 4,113,306 A * | 9/1978 | von Wimmersperg | 297/250.1 X |
| 4,205,877 A * | 6/1980 | Ettridge | 297/256.13 X |
| 4,345,791 A * | 8/1982 | Bryans et al. | 297/256.16 X |
| 4,362,336 A * | 12/1982 | Zapf et al. | 297/317 |
| 4,452,486 A * | 6/1984 | Zapf et al. | 297/343 |
| 4,480,870 A * | 11/1984 | von Wimmersperg | 297/256.13 X |
| 4,762,364 A * | 8/1988 | Young | 297/256.12 |
| 4,915,446 A * | 4/1990 | Darling et al. | 297/256.13 X |
| 4,971,392 A * | 11/1990 | Young | 297/256.12 |
| 5,029,928 A * | 7/1991 | Huber | 296/63 |
| 5,031,960 A * | 7/1991 | Day | 297/256.13 X |
| 5,498,052 A * | 3/1996 | Severini et al. | 297/324 X |
| 5,524,964 A * | 6/1996 | Weimersheimer | 297/256.12 |
| 5,803,543 A * | 9/1998 | Hartmann | 297/256 |
| 6,196,629 B1 * | 3/2001 | Onishi et al. | 297/256.12 |
| 6,241,314 B1 * | 6/2001 | Pufall | 297/256.12 |
| 6,322,142 B1 * | 11/2001 | Yoshida et al. | 297/256.13 X |
| 6,431,647 B2 * | 8/2002 | Yamazaki | 297/256.12 |
| 6,505,887 B2 * | 1/2003 | Hampton | 297/256.12 X |
| 6,572,189 B1 * | 6/2003 | Blaymore | 297/256.12 |
| 6,695,378 B2 * | 2/2004 | Hanagan | 296/65.01 |
| 6,746,080 B2 * | 6/2004 | Tsugimatsu et al. | 297/256.13 |
| 6,773,065 B1 | 8/2004 | Stamper | |
| 7,073,859 B1 * | 7/2006 | Wilson | 297/256.12 X |
| 7,108,326 B2 * | 9/2006 | Schurg | 297/325 X |
| 7,163,265 B2 * | 1/2007 | Adachi | 297/256.12 |
| 7,229,118 B2 * | 6/2007 | Saberan et al. | 297/336 X |
| 7,246,855 B2 * | 7/2007 | Langmaid et al. | 297/256.13 |
| 7,270,371 B2 * | 9/2007 | Adragna et al. | 297/317 X |
| 7,344,192 B2 * | 3/2008 | Kespohl | 297/256.13 X |
| 7,357,451 B2 * | 4/2008 | Bendure et al. | 297/256.12 |
| 7,374,245 B2 * | 5/2008 | Tanaka et al. | 297/343 |
| 2005/0225139 A1 * | 10/2005 | Biaud | 297/256.12 |
| 2006/0170262 A1 * | 8/2006 | Gold et al. | 297/256.12 |

FOREIGN PATENT DOCUMENTS

| | | |
|---|---|---|
| EP | 1247688 | 10/2002 |
| EP | 1625967 | 2/2006 |
| EP | 1625968 | 2/2006 |
| WO | 2005/000627 | 1/2005 |

* cited by examiner

CHILD CAR SEAT PIVOTING BETWEEN A UTILISATION POSITION AND AT LEAST AN INSTALLATION POSITION AND HAVING A LATCH

FIELD OF THE INVENTION

The field of the invention is child care. More precisely, the invention concerns a child car seat intended to be installed in a motor vehicle.

Still more precisely, the invention concerns a pivoting child car seat, moveable so that it has at least one installation position (facing a car door) and one utilisation position (facing the road).

PRIOR ART

With child car seats, one of the difficulties is accessibility due to the limited space between the door and the seat of the vehicle. It is generally not easy to install or remove a child from a child car seat.

To facilitate the installation of the child, it is therefore proposed to render the seat able to pivot in relation to a base or fixed structure, with the child car seat thus able to be moved between:
- a least one child installation position, facing a side door (there are generally two installation positions, the seat being able to turn to the left or to the right); and
- a travel, transport or utilisation position, facing the road.

This invention particularly concerns this type of child car seat.

For safety reasons, it is desirable that the base retains the seat in at least two areas, at the lower part (at the level of the seat) and at the upper part (in proximity to the upper part of the backrest). For this purpose, the base has two significantly perpendicular portions, one resting on the seat of the vehicle and receiving the seat of the child car seat, and another extending significantly vertically, along the backrest of the vehicle seat. This latter part of the base comprises in its upper part means to affix to the upper part of the child car seat backrest.

Solutions for affixing the backrest of the child car seat to the base have already been envisaged. Some of them implement sliding systems in the upper part of the backrest of the child car seat and intended to cooperate with a hook that is affixed to the base and which locks as soon as the child car seat pivots from installation position to the utilisation position.

Such a technique is for example explained in patent document EP-1625968.

This double linkage (lower part and upper part) of course reinforces safety in the event of an impact. However, it may happen that an incorrect manipulation of the child car seat leads to the backrest connection system with the base being not at all or incorrectly locked.

In fact, the locking of such a fixation system supposes that the user correctly pivots the child car seat towards the utilisation position, in such a way that the sliding system correctly cooperates with the hook so that it is locked. But certain users, in certain cases of misuse, rare but possible as tests on products have shown, may force the backrest in such a way that it moves away from the base so that the seat pivots without the sliding system and the hook engaging and so that the child car seat arrives in the utilisation position without the fixation system actually being locked.

Even if the user notices their error, they cannot lock the system without entirely carrying out the whole manoeuvre once again, thus pivoting the child car seat to the installation position then back to the position facing the road so that the fixation system locks.

Through inattention or negligence, it is therefore possible that, in certain rare cases, the child car seat is used without the position connection system being locked.

AIMS OF THE INVENTION

This invention particularly has as its objective to overcome the disadvantages of prior art.

It is important to note that the identification of the above problem forms part of the invention. In fact, the problem of the possible incorrect use of a pivoting child car seat, and therefore the possibility that, in certain cases, the locking may not be correctly carried out despite the means employed for guiding and pivoting, is not obvious to a person skilled in the art, who considers that the presence of such guiding means resolves the problem of the locking of the upper part. The present inventors have detected this new and specific problem.

More precisely, one aim of the invention is to provide a pivoting child car seat that has good safety qualities, particularly in that the seat is efficiently and systematically locked in its upper backrest part, regardless of any eventual careless manipulation.

Another aim of the invention is to provide a pivoting child car seat whose upper backrest part and base part are affixed regardless of the manner in which it is pivoted and manipulated from the installation position to the travel position.

Yet another aim of the invention is to provide such a child car seat whose upper part of the backrest and base may be made to be affixed even after the seat has been placed facing the road.

A secondary objective of the invention is to provide a child car seat that allows the user to know whether the upper part of the backrest is correctly affixed to the base when in its utilisation position.

The invention has still another aim which is to provide a child car seat that is relatively inexpensive to manufacture, and that is reliable over time.

PRESENTATION OF THE INVENTION

These aims, along with others that will become apparent in the following, are obtained by employing a child car seat comprising a base and a seat that pivots in relation to said base in such a way as to assume at least two positions:
- an utilisation position, in which said seat faces the road, and in which position the locking means comprise a locking element that forms part of the upper part of the backrest of said child car seat and a locking element that forms part of said base and both of which are locked
- at least one installation position, in which said seat is turned towards a door of the vehicle, and in which said locking elements are unlocked.

According to the invention, the first of said locking elements comprises at least one mobile hook that can move from a locked position to an unlocked position in which it cooperates with a fixed hooking element of the second of said locking elements, and that comprises at least one latch that may be in one of two positions:
- a rest position in which said latch or latches maintain the hook in its unlocked position
- a release position in which said hook moves to its locked position.

Preferably, at least one of said latches moves to said release position under the action of said fixed element, when said seat moves from one of said installation positions to said utilisation position.

Thus, as soon as the seat of the child car seat moves to the utilisation position, the fixation system of the upper part of the backrest locks with the base and the backrest is correctly retained at its upper part.

Advantageously, at least one of said latches is configured so as to move to said release position according to two modes:
   when said backrest is pivoted in a direction significantly parallel to said backrest
   when said backrest is pivoted in a direction significantly perpendicular to said backrest.

Thus, the fixation of the upper part of the backrest of the child car seat according to the invention to the base is carried out using two locking (or latching) modes:
   a first locking mode, known as normal, in which the locking elements of the backrest of the child car seat automatically affixes to the base in the utilisation position during the transition from one of the installation positions to the utilisation position
   a second locking mode, known as downgraded, (corresponding to misuse), in which the locking elements of the backrest affix to the base as soon as the seat is in the utilisation position, under the effect of pressure exerted in a direction significantly perpendicular to the backrest of the child car seat, tending to bring it together with the backrest of the base.

The fixation of the upper part of the backrest of the child car seat according to the invention to the base can therefore be correctly carried out even when in the utilisation position, regardless of the circumstances in which the child car seat pivots from an installation position to the utilisation position.

This approach therefore confers, according to the invention, particularly good safety qualities.

According to a preferred embodiment of the invention, said hook is associated with the first means of return that tends to bring it back into the locked position.

Thus, as soon as at least one of said latches moves into the position in which it releases the hook, the hook automatically moves into its locked position in such a way that the upper part of the backrest of the seat is affixed to the base.

Advantageously, said latch or latches are associated with a second means of return that tend to return them to said rest position.

Thus, as soon as the seat is pivoted from its utilisation position towards an installation position, and that the fixed elements no longer act upon at least one of said latches, this latch holding the hook in its unlocked position so that the seat may be freely pivoted.

According to one advantageous aspect of the invention, the child car seat comprises locking means that permit said hook to be moved to said unlocked position.

It then becomes easy to pivot the seat towards the installation position.

Advantageously, said means of unlocking may be controlled in a remote manner using a control cable.

This approach confers on the child car seat good ergonomic qualities and it is simple and inexpensive to implement.

According to one variant of the invention, the child car seat comprises a visual means for checking the transition of said hook to said locked position.

A user may then easily check that the upper part of the backrest is correctly locked to the base. This may avoid a user driving with the child car seat unlocked, and thus improve safety for the child placed in the seat.

According to another variant of the invention, the child car seat comprises two latches and said hook moves to said locked position when said two latches are in said release position.

The hook is therefore held in the unlocked position by at least one latch as soon as the seat leaves its utilisation position.

Preferably, said latches are fitted symmetrically in relation to said hook.

According to another preferred embodiment of invention, said seat comprises an indexing means that controls the correct placing of said seat in said utilisation position.

This makes it possible to ensure the proper positioning of the seat in the utilisation position when it is pivoted in that direction, and guarantees the proper locking of the fixation system of the upper part of the backrest with the base.

In an advantageous manner, said indexing means comprises at least one mobile element that can assume at least two positions, one position in which it allows rotation of said seat to the right and one position in which it allows rotation of the seat to the left.

The child car seat may thus be placed on the right or the left side of the passenger compartment of a vehicle thus, conferring good modularity upon it.

LIST OF FIGURES

Other characteristics and advantages of the invention will become clearer on reading the following description of the preferred embodiments, given as simple, non-limiting examples, along with the enclosed drawings, in which.

DESCRIPTION OF ONE EMBODIMENT OF THE INVENTION

Reminder of the Principle of the Invention

The invention thus concerns a child car seat pivoting between at least one installation position, in which it is brought to face the door of the vehicle to permit installing or removal of the child, and one utilisation position, in which it faces the road. This seat comprises locking elements permitting the upper part of its backrest to affix to the base when in the utilisation position.

According to the invention, the locking elements can be affixed (or lock) in two different ways. In the first manner of locking, known as normal, the locking elements lock automatically in the utilisation position during transition of the seat from one of the installation positions to the utilisation position (facing the road). In the second mode of locking, known as downgraded, the locking elements automatically lock as soon as the seat is in the position facing the road, under the effect of pressure, due for example to the elasticity of the backrest of the seat, exerted on the backrest of the child car seat in a direction significantly perpendicular to the backrest.

This second locking mode has the advantage of guaranteeing the proper retaining of the seat even when a user does not respect the normal conditions of use. Thus the risks to the child are eliminated, even in the case of misuse.

Thus, whatever the circumstances in which the child car seat pivots from one of the installation positions to the utilisation position, the locking elements of the upper part of the backrest according to the invention affix to the base in a satisfactory manner.

Figure 1:
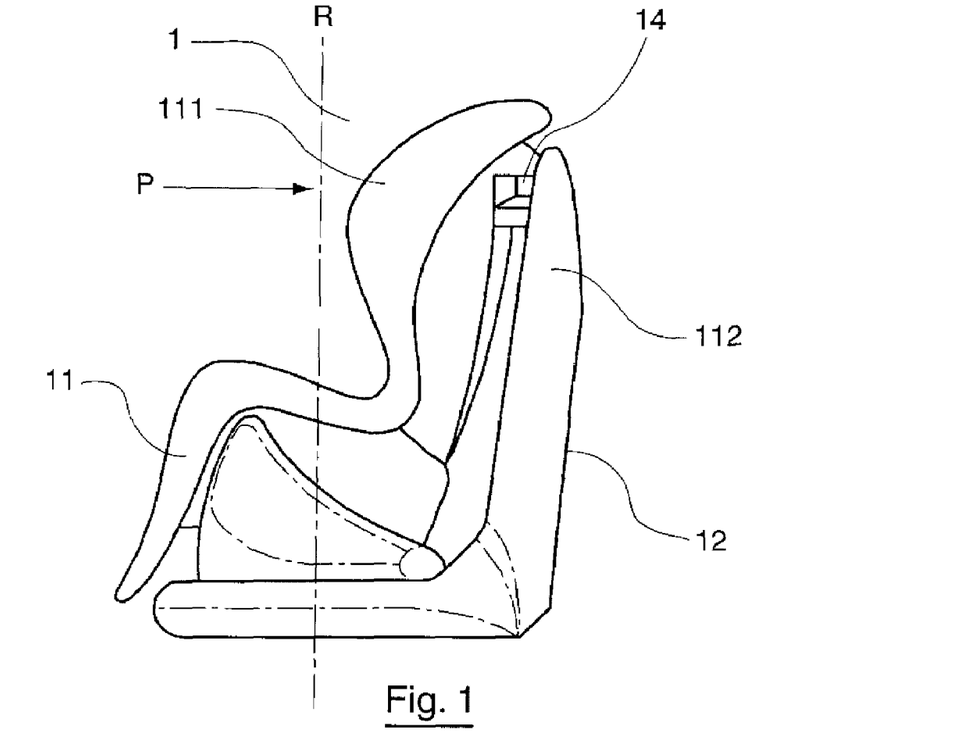
FIGS. 1 and 2 respectively show a child car seat according to the invention placed in the utilisation position and an upper portion of the seat in the installation position
Figure 2:
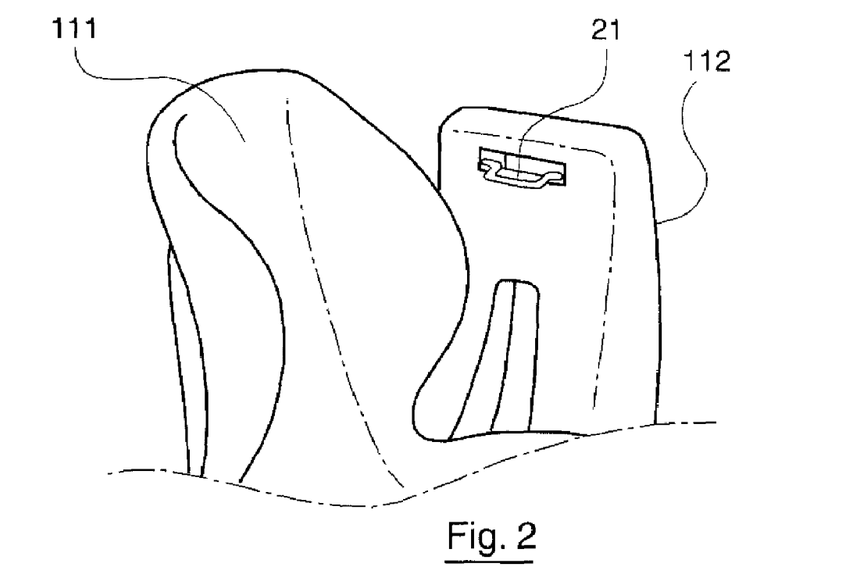

FIGS. 1 and 2 illustrate the general principle of the invention.

As shown in these figures, a seat 11 of a pivoting child car seat 1 is mounted so as to pivot on base 12, between a position facing the road (FIG. 1) and a position facing the door of the vehicle (FIG. 2). A first locking element formed, for example, by a fixed anchor point 14, is affixed to the backrest 111. A mobile hook 21 is affixed to vertical part 112 of base 12. This hook 21 is moveable between an unlocked position in which it is remote from anchor point 14, and a locked position in which it cooperates with anchor point 14.

In the various means of realising the invention presented further on, the hook may be either affixed to the seat or to the base and the anchorage may be affixed to the seat or the base.

Both previously mentioned locking modes (normal and downgraded) will now be illustrated.

When seat 11 of the child car seat 1 pivots around axis R, i.e., in a direction significantly parallel to backrest 111 of seat 11, to move from the installation position to the utilisation position, the hook 21 moves into the locked position in which it cooperates or engages with anchor point 14.

Due to misuse, it might happen that hook 21 does not engage with anchor point 14 during the pivoting. In this case, a pressure in the direction of arrow P, for example, due to the elasticity of backrest 111 of seat 11, will tend to slightly move backrest 111 of seat 11 in a direction significantly perpendicular to backrest 111, and thus bring about the passage of hook 21 into the locked position, i.e., its engagement to anchor point 14, when the car child seat is in the utilisation position.

Thus, if hook 21 and anchor point 14 do not directly engage during the pivoting, the user does not have to replace the car child seat in the installation position and then re-pivot it into the utilisation position for hook 21 to move to the locked position. It enters the locked position as soon as the user ceases to hold apart the two elements (for example under the effect of the elasticity of the parts).

Once in the locked position, hook 21 prevents any rotation of seat 11 of the child car seat 1 towards the front of the vehicle, such as might take place during an impact for example due to an accident.

Example of One Embodiment: System with Two Mobile Latches

The System with Two Mobile Latches

We show, in FIGS. 2 to 8, one example embodiment of the child car seat according to the invention.

In this particular embodiment, a locking element, shown by fixed anchor point 202, is affixed to the side turned towards the interior of the passenger compartment with part 201 of a base intended to press against the backrest of the vehicle seat (not shown here). The anchor point 202 takes the form of a significantly U-shaped bar.

Figure 3:
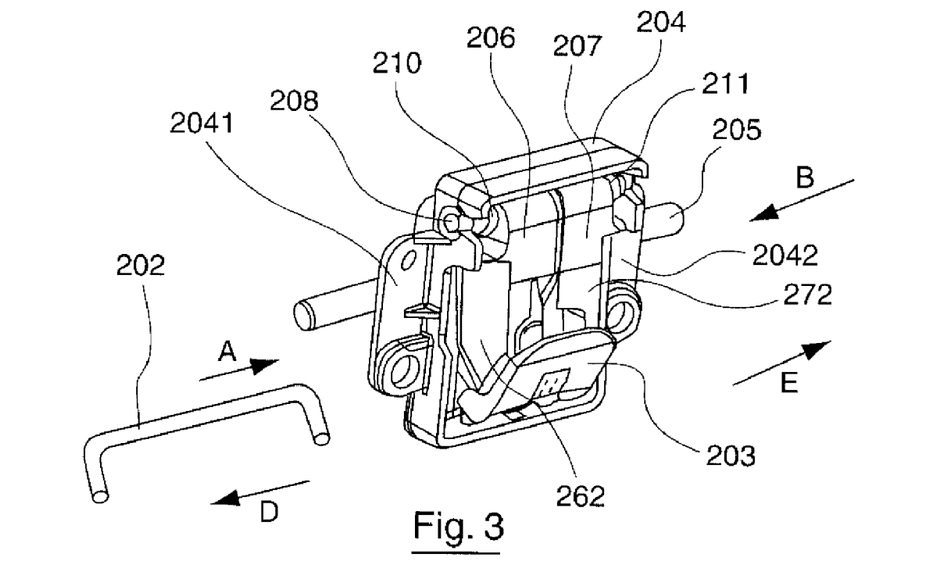
FIG. 3 is a perspective view showing a first embodiment of the fixation system of the upper part of the backrest of the child car seat to the base, according to the invention, in which mobile latches free a mobile hook, affixed to the seat, in such a way that it affixes to a fixed element of the base, when the seat moves from the installation position to the utilisation position

FIG. 3 shows another locking element taking the form of a hook 203 that moves between a locked position and an unlocked position, and that is affixed to the upper part of the backrest of a car seat (not shown).

Figure 4:
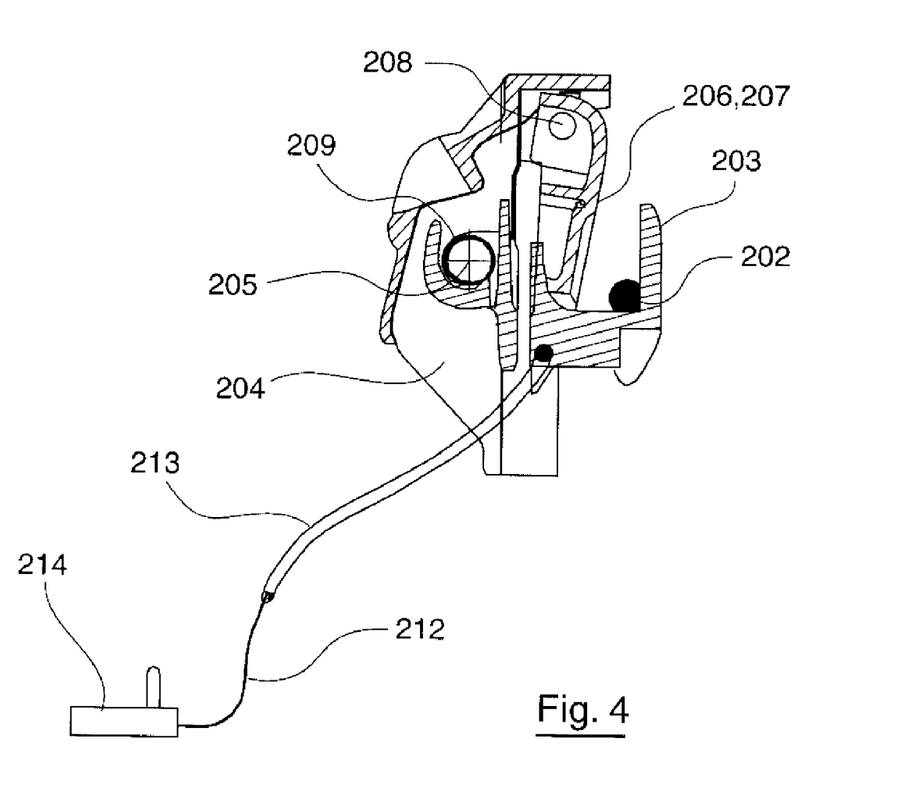
FIGS. 4 to 8 show the different side views of the fixation system shown in FIG. 3 in which the hook is sometimes in the locked position (FIGS. 4, 6, 7) sometimes in the unlocked position (FIGS. 5, 8)
Figure 6:
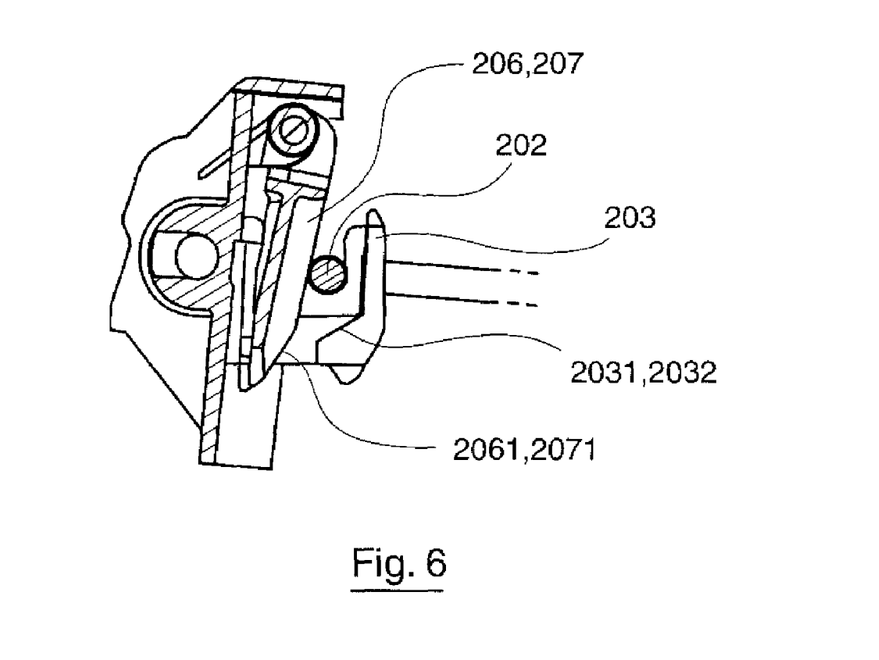
Figure 7:
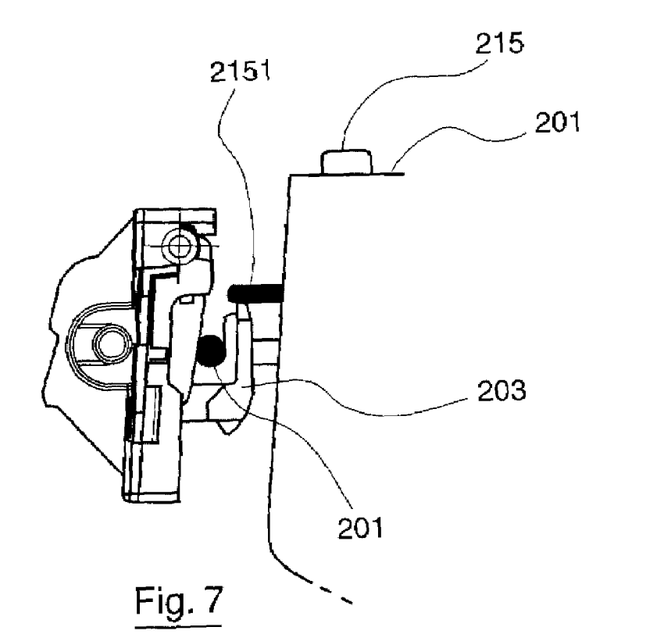

The hook 203 is affixed to housing 204 via the intermediary of shaft 205. The hook 203 is free to rotate around shaft 205. Return means, here using torsion spring 209, tend to bring hook 203 back into a locked position as shown in FIGS. 4, 6 and 7, in which it cooperates with anchor point 202 affixed to base 201.

Housing 204 is affixed to the backrest of seat 11.

Figure 8:
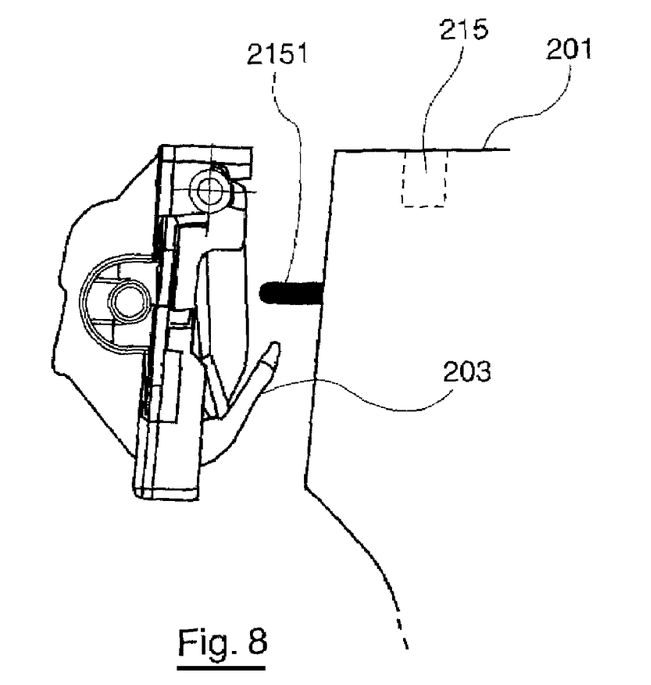

Two latches 206 and 207, moveable between a rest position (shown in FIGS. 5 and 8) and a release, or freed, position (shown in FIGS. 4, 6 and 7) are linked to housing 204 via the intermediary of a shaft 208. The latches 206 and 207 are free to rotate around shaft 208. A means of return, here using torsion springs 210 and 211, tend to bring latches 206 and 207 back into the rest position in which they retain hook 203 in its unlocked position as shown in FIGS. 5 and 8.

In the normal locking mode, bar 202 integral with part 201 of the base is arranged in the direction of arrow A. The bar 202 successively enters in contact with latches 206 and 207 and progressively acts against the return force of torsion springs 210 and 211 on latches 206 and 207 so that they move from the rest position to the freed position in which they free hook 203. The latches 206 and 207 each have an inclined plane 262, 272 intended to cooperate with bar 202 in such a way as to facilitate their transition from the rest position to the freed position. After hook 203 is freed, a torsion spring 209 provides it with the force to move it from the unlocked position to the locked position in which hook 203 cooperates with bar 202 (FIGS. 4, 6, 7). The child car seat is then locked in the utilisation position.

The child car seat according to the invention, can be installed on either the right or left side of the passenger compartment of a vehicle. If it is placed on the right of the passenger compartment (when one is inside the vehicle facing the road), bar 202 then is arranged in the direction of arrow B. In this case, the movement of hook 203 from the unlocked position to the locked position as described above, remains identical, apart from the fact that bar 202 successively enters in contact with latches 207 then 206 during the pivoting.

Figure 5:
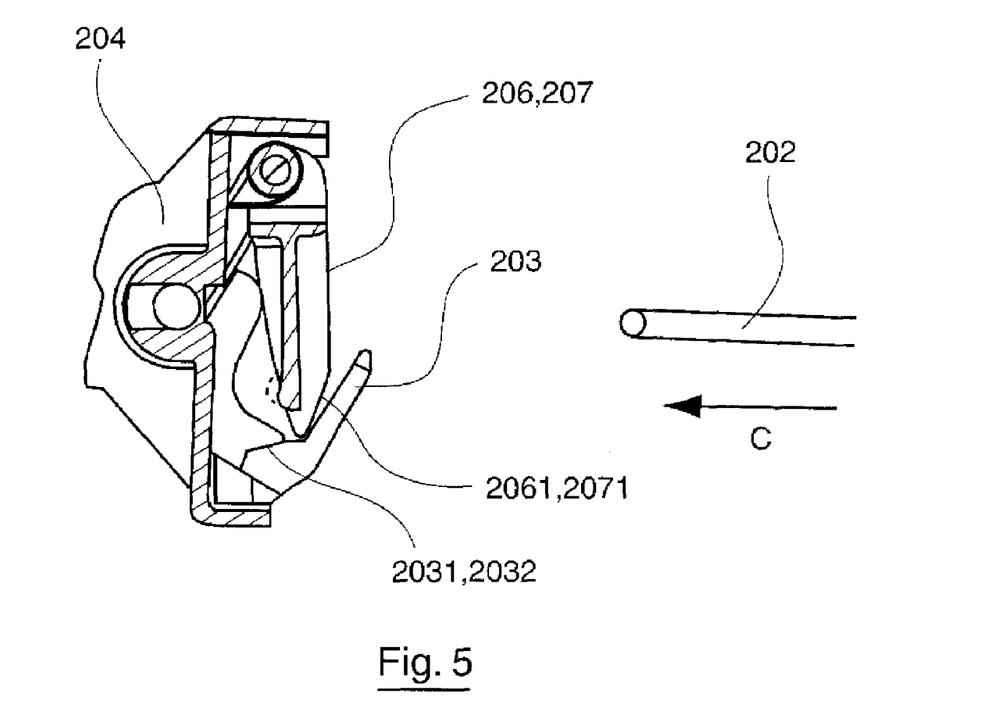

In the downgraded locking mode, bar 202 is arranged in the direction of arrow C (FIG. 5). It simultaneously enters in contact with latches 206 and 207, and acts against the force of torsion springs 210 and 211 on latches 206 and 207 such that they move from the rest position, shown in FIGS. 5 and 8, to the freed position, shown in FIGS. 4, 6, 7, in which they free hook 203. After hook 203 is freed, the torsion spring 209 exerts pressure so that it moves from the unlocked position to the locked position in which hook 203 cooperates with bar 202. The child car seat is then locked in the utilisation position.

To obtain the unlocking of hook 203, in order to move the seat from the utilisation position to one of the installation positions, the hook 203 must be disengaged from bar 202. This can be done, for example, by means of a cable system.

A cable 212, passing through cable sheath 213, is linked to one of the extremities of hook 203. The other extremity of cable 212 is linked to one or more means of control that may take the form of a pull handle 214 located, for example, at the level of the armrests of the child car seat.

When cable 212 is pulled on via pull handle 214, hook 203 is placed in the unlocked position so that it is no longer engaged by bar 202. The child car seat can then pivot.

When the child car seat is pivoted from the utilisation position to the installation position in the direction of arrow D, bar 202 first frees latch 207. Under the effect of torsion spring 211, latch 207 moves from the freed position to the rest position in which it holds hook 203 in the unlocked position. The latches 206 and 207 possess a lower inclined portion 2061 and 2071 that is intended to cooperate with the inclined parts 2031 and 2032 on hook 203 so as to facilitate their passage from the freed position to the rest position (and vice versa). If the movement in the direction of arrow D is continued, bar 202 frees latch 206, which under the effect of torsion spring 210 moves from the freed position to the rest position in which in turn it holds hook 203 in the unlocked position. The child car seat can then be pivoted.

The child car seat can be installed on the left or right side of the passenger compartment of the vehicle, the pivoting of the seat in the direction of arrow E will lead in the same way to the transition of hook 203 from its locked position to its unlocked position, apart from the fact that latch 206 will be freed first.

Double Latch

The fact that the fixation system implements two latches permits, if the user releases the pull handle before the two mobile wedges are in the rest position, that hook 203 is nevertheless held in its unlocked position by the first latch freed by bar 202.

Correct Latching Indicator

In this second embodiment, we foresee the child car seat, according to the invention, having a correct latching indicator that allows the user, i.e., the person manipulating the child car seat, to ensure that the seat is locked in the utilisation position and therefore that the locking elements ensuring fixation of the upper part of the backrest of the child car seat to its base are affixed in a suitably solid manner.

A warning flag 215 is moveable between a deployed position in which it is visible by the user and a retracted position in which it is hidden in the interior of the base of the child car seat and therefore not visible. The warning flag 215 is associated with an informing bolt 2151 leading from the base. A means of return, using for example a compression spring (not shown in the figures), tends to bring the warning flag 215 into its deployed position.

When the child car seat pivots from the installation position to the utilisation position, hook 203 engages bar 202 and enters into contact with the bolt 2151. The hook 203 opposes the compression force of the spring exerted on warning flag 215 in such a way that it moves from its retracted position to its deployed position and becomes visible by the user of the child car seat (FIG. 7).

The warning flag 215 may be of a particular colour or may bear a message informing the user of the child car seat of the fixation status of the fixation system.

When the child car seat pivots from the utilisation position to an installation position, hook 203 unlatches and frees bolt 2151 in such a way that under the effect of the compression spring, warning flag 215 moves to the retracted position in which it is no longer visible by the user of the child car seat (FIG. 8).

The user is thus in a position to determine whether the hook is in the locked position and therefore if the child car seat is correctly locked in the utilisation position.

Other Characteristics

In a variant of the previously described embodiments, we anticipate a child car seat according to the invention and comprising an indexing means, controlling the rotation of the seat and forming a stop, so as to guarantee the proper positioning of the seat in its utilisation position when it is pivoted.

A first mode of realising such a limiting means may be such as that described in patent number EP-1625967.

Figure 9A:
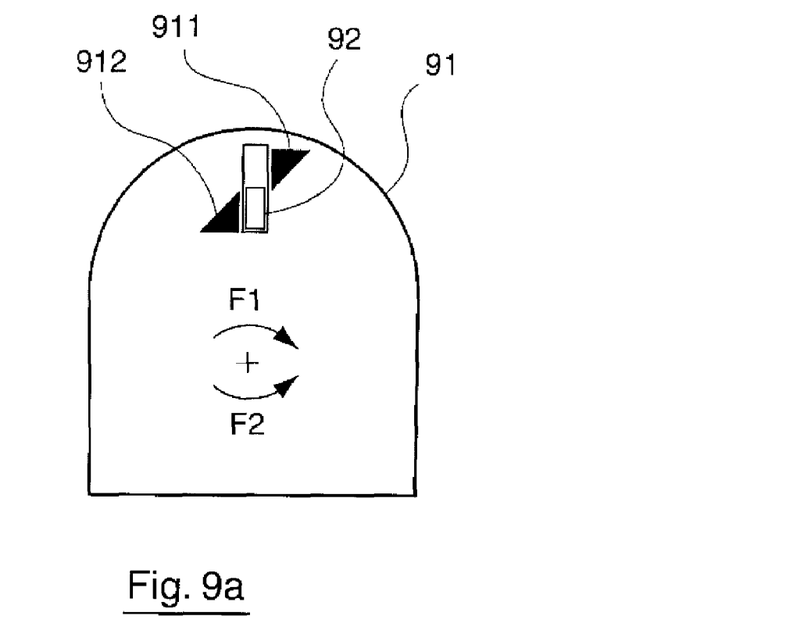
FIGS. 9a and 9b illustrate one embodiment in which the child car seat according to the invention implements a means of indexing the rotation of the seat.
Figure 9B:
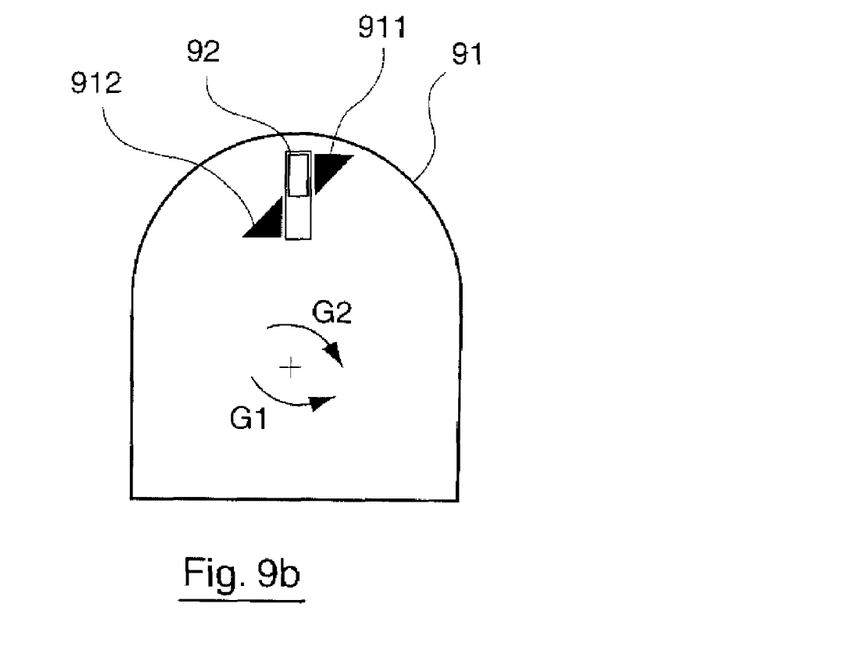

Another embodiment is shown in FIGS. 9a and 9b, in which the pivoting seat 91 has two stops 911 and 912 on its lower part. One mobile stop 92, affixed to the base (not shown), is intended to cooperate with stop 911 or stop 912 in the utilisation position, in such a way as to guarantee that seat 91 is correctly positioned in the utilisation position, and that the fixation system of the upper part of the backrest of seat 91 and the base lock correctly.

The mobile stop 92 may assume two positions depending on whether the child car seat is placed on the left or the right side of the passenger compartment of the vehicle.

When the seat is placed on the left side of the vehicle, the mobile stop 92 is placed in the position shown in FIG. 9a. Seat 91 can then be pivoted in the direction of arrow F1 until it arrives at the utilisation position in which mobile stop 92 cooperates with stop 912 so that seat 91 is correctly positioned in the utilisation position and so that the fixation system locks correctly. Seat 91 may be brought to the installation position by pivoting it in the direction of arrow F2.

When the child car seat is placed on the right side of the vehicle, mobile stop 92 is placed in the position shown in FIG. 9b. Seat 91 can then be pivoted in the direction of arrow G1 until it arrives at the utilisation position in which mobile stop 92 cooperates with stop 911 so that the seat 91 is correctly positioned in the utilisation position and the fixation system locks correctly. Seat 91 may be brought to the installation position by pivoting it in the direction of arrow G2.

The inclined faces of stops 911, 912 automatically permit the bringing of mobile stop 92 to the correct position (FIG. 9a or 9b) if a through to misuse fails to position it correctly.

The different parts constituting the fixation systems used in the various embodiments of a child car seat according to the invention described above in particular the hook and anchor point, are constructed from materials having mechanical characteristics sufficient to resist forces resulting from an impact due, for example to an accident. The bars and hooks may be metal, for example.

According to other embodiments, a single latch may be provided, or an ensemble of three (or more) latches.

The invention claimed is:

1. A child car seat, comprising:
   a base positionable within a vehicle on a vehicle seat;
   a seat having a backrest, wherein the seat is pivotally disposed on the base such that the seat may pivot between at least a utilization position, where the seat faces a road, and an installation position, where the seat is turned toward a door of the vehicle;
   a first locking element disposed on the backrest at a portion of the backrest adapted to abut against a backrest of the vehicle seat; and
   a second locking element disposed on a vertical part of the base;
   wherein the first locking element comprises
      a mobile hook that is moveable between a hook locked position and a hook unlocked position, and
      at least one latch that is moveable between a rest position where the at least one latch holds the mobile hook in the hook unlocked position and a release position where the at least one latch holds mobile hook in the hook locked position;
   wherein the second locking element comprises a fixed hooking element disposed on the vertical part of the base;

wherein the mobile hook and the at least one latch are locked together in a locked position as the seat is moved to the utilization position;

wherein the mobile hook and the at least one latch are disengaged in an unlocked position as the seat is moved to the installation position.

2. The child car seat of claim 1, wherein the fixed hooking element interacts with the first locking element to actuate the at least one latch so that the at least one latch moves from the hook unlocked position to the hook locked position.

3. The child car seat of claim 1, wherein the at least one latch moves between the hook unlocked position and the hook locked position in response to at least one of movement of the seat in a direction substantially parallel to the backrest and movement of the seat in a direction substantially perpendicular to the backrest.

4. The child car seat of claim 1, further comprising:
a return element that biases the mobile hook in the hook locked position.

5. The child car seat of claim 4, wherein the return element is a spring.

6. The child car seat of claim 1, further comprising:
an unlocking element to cause the at least one latch to move from the hook locked position to the hook unlocked position.

7. The child car seat of claim 6, further comprising:
at least one control cable connected to the unlocking element, wherein the unlocking element is controlled remotely via the at least one control cable.

8. The child car seat of claim of claim 1, further comprising:
a visual indicator to indicate when the mobile hook is in the hook locked position.

9. The child car seat of claim 1, wherein the at least one latch comprises a first latch and a second latch, both of which are moveable between the rest position where the first and second latches hold the mobile hook in the hook unlocked position and the release position where the first and second latches hold mobile hook in the hook locked position.

10. The child car seat of claim 9, wherein the first and second latches are symmetrically mounted adjacent to the mobile hook.

11. The child car seat of claim 9, wherein the first and second latches are mounted in a side-by-side relation to one another.

12. The child car seat of claim 1, further comprising:
an indexing element to position the seat in the utilization position.

13. The child car seat of claim 12, wherein the indexing element comprises at least one mobile element that is positionable in a first position where the at least one mobile element permits rotation of the seat in a right-hand direction and a second position where the at least one mobile element permits rotation of the seat in a left-hand direction.

* * * * *